United States Patent

[11] 3,569,799

[72] Inventors Frank F. Fang;
Alan B. Fowler, Yorktown Heights, N.Y.
[21] Appl. No. 609,113
[22] Filed Jan. 13, 1967
[45] Patented Mar. 9, 1971
[73] Assignee International Business Machines Corporation
Armonk, N.Y.

[54] NEGATIVE RESISTANCE DEVICE WITH CONTROLLABLE SWITCHING
9 Claims, 6 Drawing Figs.

[52] U.S. Cl. .......... 317/235, 307/299
[51] Int. Cl. .......... H01l 11/00
[50] Field of Search .......... 317/234/8, 234/8.1, 234/9, 235/40, 235/41.1, 235/25, 235/21.1

[56] References Cited
UNITED STATES PATENTS

| | | | |
|---|---|---|---|
| 3,045,129 | 7/1962 | Atalla et al. | 317/234/8.1 |
| 3,060,327 | 10/1962 | Dacey | 317/234/8.1 |
| 3,081,404 | 3/1963 | Memelink | 317/235/41.1 |
| 3,206,670 | 9/1965 | Atalla | 317/235/21.1 |
| 3,207,962 | 9/1965 | Slusher | 317/235/41.1 |

OTHER REFERENCES

IBM Technical Disclosure Bulletin, " Thin Film Tunnel Devices" by Magill et al., Vol. 5, No. 10, March 1963, Pg. 126 317/234/8

*Primary Examiner*—Jerry D. Craig
*Attorneys*—Hanifin and Jancin and Bernard N. Wiener

ABSTRACT: This disclosure provides a control feature for a solid state device which has a negative resistance characteristic in the current-voltage curve due to an insulator in the current path. A negative resistance device is fabricated by planar technology to have an insulator layer interposed between a semiconductor layer and a metal layer in the negative resistance current path. The control feature is provided through a control electrode which has a lateral junction in the semiconductor layer and near to the current path through the insulator layer.

Control voltage pulses of opposite polarities applied to the control electrode obtain switching between stable states of the device in both directions without a requirement of turning off the current.

INVENTORS
FRANK F. FANG
ALAN B. FOWLER

BY Bernard N. Wiener
ATTORNEY

NEGATIVE RESISTANCE DEVICE WITH CONTROLLABLE SWITCHING

This invention relates generally to three terminal current conductive devices having a negative resistance current-voltage characteristic, and it relates more particularly to such devices having a semiconductor material as an integral part thereof and wherein a control electrode obtains switching from one stable state to another stable state.

Prior art experiments have provided data revealing negative resistance in the current-voltage characteristic of diode structures wherein an insulator layer is present in contact with adjacent material, either metal and metal or metal and semiconductor. This phenomenon has not been explained theoretically in a manner accepted by those skilled in the technology of this field of the prior art. Among the theoretical explanations presently being given credence is the postulate that the negative resistance results from tunneling into the insulator conduction band, consequent avalanching, and sustaining of the avalanche by voltages resulting from a space charge distribution. Recent literature articles which present illustrative prior art experimental data on diode devices with this negative resistance characteristic are the following:

a. "A New Negative-Resistance Device," D. V. Geppart, Proceedings of the I.E.E.E. (Correspondence), Volume 51, Jan. 1963, page 223.
b. "Current-Controlled Negative Resistance in Thin Niobium Oxide Films," K. L. Chopra, Proceedings of the I.E.E.E.(Correspondence), Volume 51, Jun. 1963, pages 941—942.
c. "Avalanche Injection in CdS Films," K. L. Chopra, Proceedings of the I.E.E.E. (Correspondence), Volume 51, Sept. 1963, page 1242.
d. "Observations of Negative Resistance Phenomena and Oscillations in Si-$SiO_2$-Metal Diodes" T. Hayashi et al., Japan Journal of Applied Physics, (Short Notes), Volume 3, 1964, pages 500—501.
e. "A Negative Resistance in a MOS structure," H. Kuwano et al., Japan Journal of Applied Physics (Short Notes), Volume 4, 1965, pages 383—384.
f. "Switching Characteristics of the GaAs Film," Y. Mizushima et al., Proceedings of the I.E.E.E.(Correspondence) Volume 53, 1965, pages 322—323.
g. "Properties of Avalanche Breakdown in the GaAs Thin-Film Switching," Y. Mizushima et al., Proceedings of the I.E.E.E.(Correspondence), Volume 53, 1965, pages 509-—510. All the negative resistance phenomena reported in the above noted prior art items (a) to (g), which involve insulators are in diodes, i.e., two terminal devices, and no independent control feature is involved.

Other prior art devices have negative resistance characteristics and switch by a control electrode but are not able to switch both ways, which the following is an illustrative example:

"The Electrical Characteristics of Silicon P-N-P-N Triodes," I. M. Mackintosh, Proceedings of the I.R.E., Volume 46, Jun. 1958, pages 1229—1235.
For a particular resistance in the current path of such controlled rectifier negative resistance devices of the prior art, there are two stable operating points. To switch from a low current and high voltage state to a high current and low voltage state, the prior art in controlled rectifiers establishes an "ignition" condition with a cathode electrode.

Except for turning off a prior art device, there has not been available any way to transfer the operation of the device from a high current and low voltage state to a low current and high voltage state by applying a signal at the control electrode. It is desirable for negative resistance devices for logic and other circuits that they be switched from one state to the other or vice versa by means of signals on a control electrode. This provides the required isolation in most logic circuits as well as the ease of controlling power in power handling circuits.

It is an object of this invention to provide a three terminal device for semiconductor technology wherein a control electrode permits switching between stable operational points without necessity of turning off the device.

It is another object of this invention to provide a negative resistance current conductive device wherein control of the current in the device is obtained ancillary to the current path itself.

It is another object of this invention to provide a negative resistance device wherein stable current-voltage operational conditions are interchanged by minority carrier control in a semiconductor portion thereof.

It is another object of this invention to provide a three terminal device having a negative resistance characteristic in a current-voltage path thereof wherein an insulator layer is interposed between adjacent current conductive layers of which one layer is a metal, and a control electrode provides for both stable operational conditions of the current-voltage negative resistance characteristic.

It is another object of this invention to provide a three terminal device having a negative resistance characteristic in which a minority carrier injecting electrode contiguous to an insulator layer in the device controls the stable operational points on the negative resistance characteristic.

It is another object of this invention to provide a three terminal device having an insulator layer between a semiconductor and metal wherein a control electrode in the semiconductor injects or extracts minority carriers into or from said device and consequently controls which of the two stable operational conditions is maintained for the current path.

It is another object of this invention to provide a three terminal device having a negative resistance characteristic in a current conductive path wherein a minority carrier injecting or extracting electrode is contiguous to an insulator layer and in a semiconductor layer.

It is another object of this invention to provide a three terminal device having a negative resistance characteristic in a current-conductive path thereof wherein a planar structure having an insulator layer between a metallic layer and a semiconductor layer utilizes a control electrode with minority carrier injection and extraction capabilities established in the semiconductor layer and proximate to the insulator layer by the order of the diffusion length of minority carriers in the semiconductor layer.

It is another object of this invention to provide for control of the stable operational condition of a negative resistance device wherein an insulator layer is interposed between and adjacent to current-conductive layers with voltage barriers established at both conducting layers.

It is another object of this invention to provide control means for the current conductive path in a device having a negative resistance characteristic with an insulator therein wherein a control voltage pulse of one sign on the control means establishes one stable operating condition for the negative resistance device and a control voltage pulse of opposite sign on the control means establishes another stable operating condition for the device.

The foregoing and other objects, features, and advantages of the invention will be apparent from the following more particular description of preferred embodiments of the invention, as illustrated in the accompanying drawings.

Figures 1, 2A, 2B, 3:
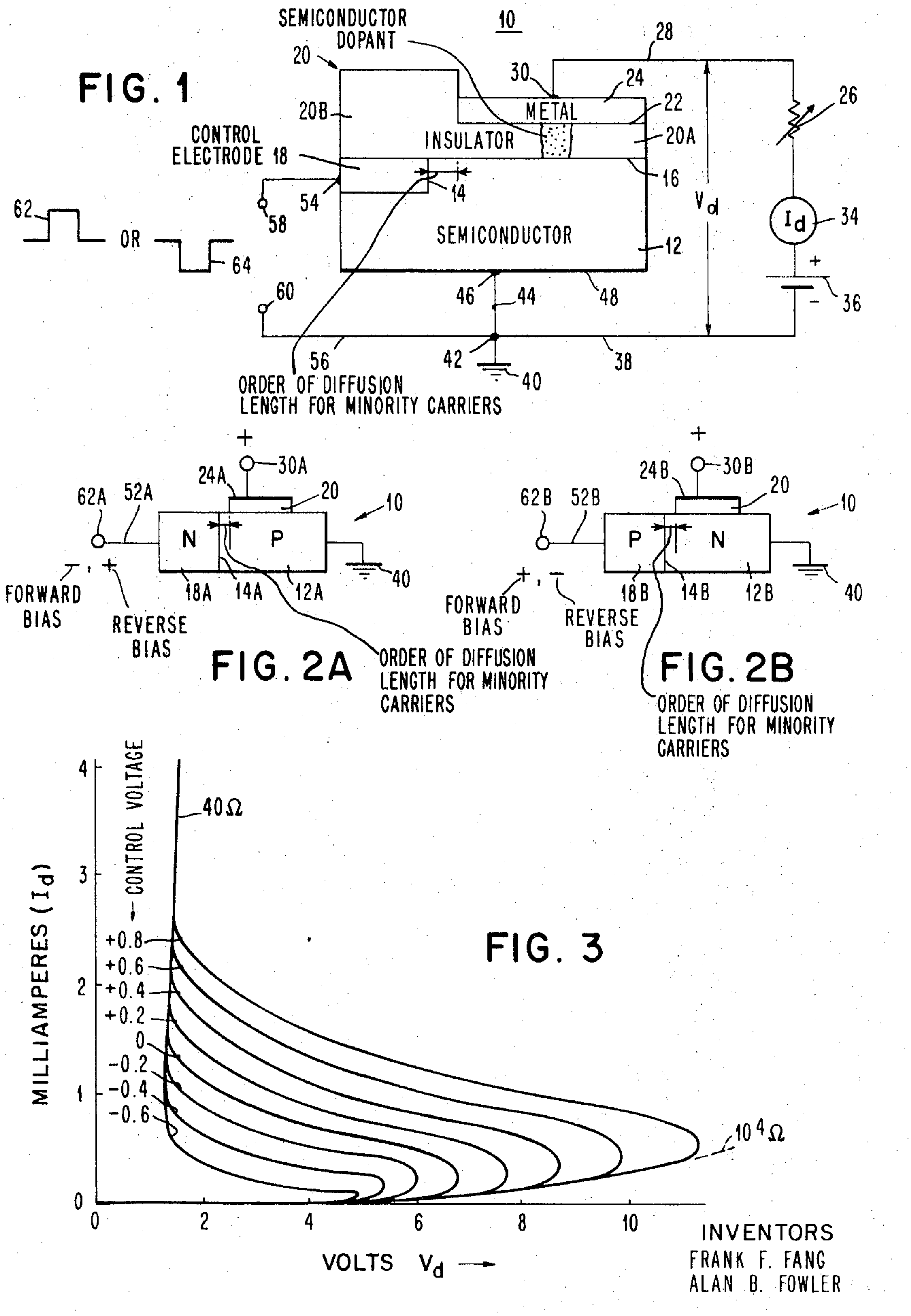
FIG. 1 is a schematic diagram illustrating a planar structure for the practice of this invention in which a lateral junction is established in a semiconductor adjacent to an insulator layer thereon.
FIG. 2A is a schematic diagram illustrating an embodiment of this invention in which the control electrode is an N-type semiconductor.
FIG. 2B is a schematic diagram illustrating an embodiment of this invention in which the control electrode is a P-type semiconductor.
FIG. 3 is a series of negative resistance characteristics for an experimental device according to this invention as shown in FIG. 2A illustrating that a reverse bias on the control electrode increases the threshold voltage of the negative resistance characteristic and a forward bias on the control electrode decreases the threshold voltage of the negative resistance characteristic.
Figure 4:
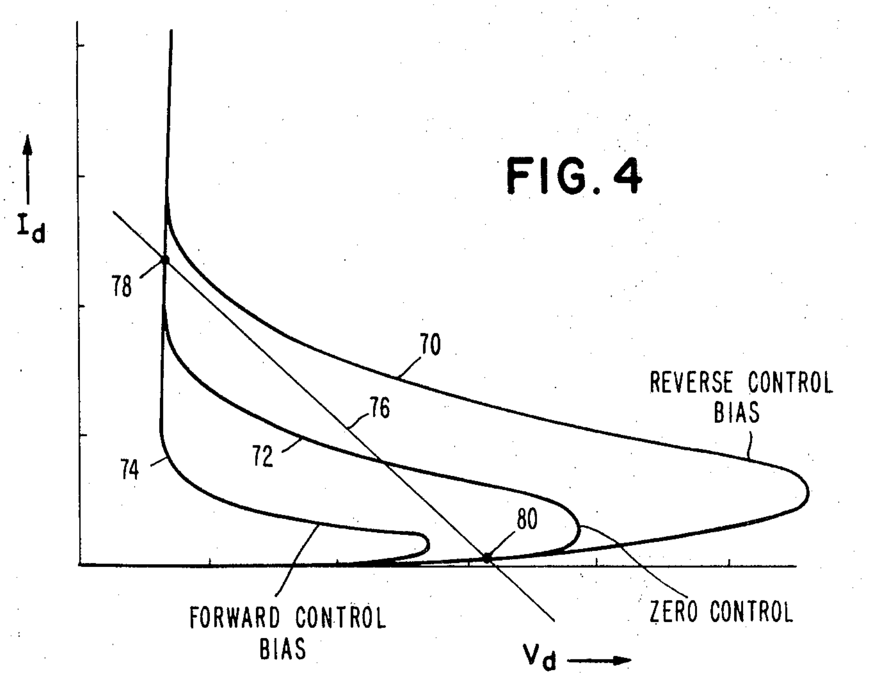

FIG. 4 presents a series of current-voltage curves similar to those presented in FIG. 3 together with a resistance load line for the current path of a device of this invention useful for describing the manner in which transfer between stable operational states is achieved.

Figure 5:
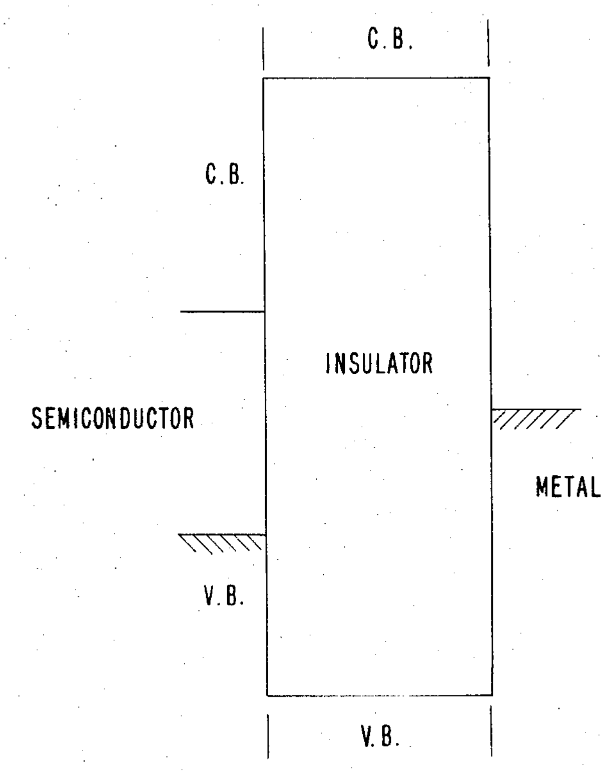

FIG. 5 is a line diagram illustrating the relationships among the band diagrams of semiconductor, insulator, and metal of a planar configuration for the practice of this invention.

DESCRIPTION OF INVENTION

Generally, this invention provides a three terminal device having an insulator layer therein across which there is a negative resistance in a current path and a control means ancillary to the current path produces a change in the operational condition on the negative resistance characteristic from a high current and low voltage state to a low current and high voltage state and vice versa without necessity of turning off the device for either transition.

An embodiment for the practice of this invention includes an insulator layer having a metal layer thereon incorporated in the current path and another layer thereon of a semiconductor material also in the conductive path. The control structure includes an ancillary electrode layer in the semiconductor layer and proximate to the insulator layer in the order of a diffusion length of minority carriers injected by said ancillary electrode into the semiconductor material.

Specific embodiments of this invention presented herein are:

First, a $SiO_2$ insulator layer interposed between an A1 metal layer and an Si semiconductor layer of P-type with an N-type ancillary layer, e.g., predominantly doped with phosphorous.

Second, an insulator layer of $SiO_2$ interposed between N-type Si and A1 with the ancillary electrode layer being P-type, e.g., predominantly doped with boron.

The nature and operation of this invention will be presented with reference to the FIGS. of which FIG. 1 is a schematic diagram illustrating a planar solid state configuration for the practice of this invention electrically connected for demonstrative operation. The planar configuration 10 made by conventional planar technology comprises a semiconductor 12 with a lateral control junction 14 established in the upper surface 16 thereof by control electrode 18. An insulator 20 is established adjacent to the upper surface 16 of semiconductor 12 with lateral junction 14 of control electrode 18 being in order of the diffusion length for minority carriers in semiconductor 12 near thin insulator portion 20A. The insulator portion 20B is substantially thicker than the thin insulator portion 20A to prevent conduction between metal layer 24 and control electrode 18. There is established on the upper surface 22 of insulator 20 a metal layer 24.

The electrical connections for planar configuration 10 to establish it in a demonstrative operational condition include variable resistor 26 connected by line 28 to ohmic contact 30 on the upper surface 32 of metal 24. Resistor 26 is further connected via ammeter device 34 to the positive terminal of battery 36, whose negative terminal is connected via line 38 to ground 40 at connection point 42. Connection point 42 is connected via line 44 to ohmic contact 46 on the lower surface 48 of semiconductor 12. The electrical path including the semiconductor 12, insulator 20A and metal 24 of planar configuration 10 together with resistance 26 and voltage source 36 comprises the device current path for the embodiment of FIG. 1. The device voltage for the planar configuration 10 is measured between ohmic contact 30 on metal 24 and ohmic contact 46 on semiconductor 12.

The control path from ohmic contact 46 to ohmic contact 54 includes terminals 58 and 60 to which is applied either positive control voltage pulse 62 or negative control voltage pulse 64.

In FIGS. 2A and 2B there are presented schematic diagrams of illustrative embodiments of this invention showing various materials for the semiconductor 12 and the control electrode 18 which are also used for explaining the various negative resistance characteristics for a planar configuration 10 when different control voltages are applied to control electrode 18. FIGS. 2A and 2B illustrate particularly that the lateral junction 14 for a device according to the practice of this invention can be obtained with the control electrode 18 being an N-type semiconductor and the semiconductor 12 being P-type or the control electrode 18 can be P-type semiconductor for which the semiconductor 12 is N-type. The aspects of FIGS. 2A and 2B corresponding to comparable aspects of the embodiment of FIG. 1 are characterized by the same numbers modified to indicate which of the latter two FIGS. is involved.

The manner in which the negative resistance characteristic of a device 10 is controlled will be described with reference to FIG. 3, which presents a plurality of current voltage curves for the embodiment of FIG. 2A, where the semiconductor 12A is P-type Si, the insulator layer 20 is $SiO_2$, and the control electrode 18A is N-type Si. Illustratively, the N-type dopant is phosphorous and the P-type dopant is boron. In the specific devices illustrated in FIGS. 2A and 2B, the $SiO_2$ layer was doped with GaP or Ga from the vapor at 800° C. For other insulators, e.g., those referred to in the noted prior art literature, the insulator layer is not referred to as being doped. The only requirement for the insulator layer for the practice of this invention is that it exhibit a negative resistance characteristic when it is the intermediate layer in a metal-insulator-semiconductor diode.

The experimental data presented in FIG. 3 shows that if the junction 14A of the configuration 10 of FIG. 2A is reverse biased that the negative resistance characteristic when of the I—V curve is extended to the right and that it is extended to the left if the junction 14A is forward biased. It is further observed that for a given control voltage 62 or 64 on control electrode 18 that there is an amplification factor in the voltage across the device 10. The holding voltage is typically 1.5 volts to 3.0 volts, and the threshold voltage was observed experimentally to vary between 5 volts and 20 volts. Typically, dynamic resistances are 40 ohms and $10^4$ ohms in the low and high resistance regions, respectively. With control voltage pulses 62 and 64 and with a suitable load resistance 26 in series with the device 10, switching between stable operational states is achieved in both directions, e.g., 200 nanoseconds, where 1 nanosecond equals $10^{-9}$ seconds.

The operation of a typical device for the practice of this invention will be explained with reference to the exemplary negative resistance curves shown in FIG. 4. Curve 70 is a negative resistance characteristic for a reverse bias on the control electrode 18 of FIG. 1; curve 72 is the negative resistance characteristic for 0 bias on control electrode 18; and curve 74 is for forward bias on control electrode 18. A load line 76 for a suitable chosen load resistor 26 establishes stable operational points 78 and 80 on negative resistance characteristic 72. Assuming a device is in the operational state 78, switching is obtained to the state 80 by a reverse bias voltage pulse applied to control electrode 18 sufficient to establish transiently a negative resistance characteristic 70 for the device. Since the load line 76 does not intersect the low resistance stable portion of curve 70, the operation thereof must be at point 80 and the current in the device would stabilize toward point 80. When the reverse bias pulse terminates, the stable operational state for the device is at point 80.

When a device for the practice of this invention is in operational condition at stable operating point 80 of negative resistance characteristic 72 and it is desired to switch the operation of the device to stable operational point 78, a forward bias voltage pulse is applied to control electrode 18 sufficient to establish transiently a negative resistance characteristic for the device as curve 74. Since load line 76 does not intersect the initial portion of curve 74, the current in the device path tends to stabilize toward the intersection of the load line and the upper portion of curve 74. As operational point 78 is almost identical for both curves 74 and 72, after the forward bias voltage pulse on control electrode 18 terminates, the operation stabilizes at operational point 78.

As has been presented hereinbefore, the threshold voltage for a device according to the practice of this invention is increased when the control junction electrode is reverse biased. This enables the switching between the stable operational states in either direction with a single control electrode.

Although the origin of the negative resistance for the prior art devices having an insulator layer interposed between a metal layer and a semiconductor layer has not been theoretically described in a commonly accepted manner by the solid state art, it is presumed that the origin of the negative resistance may be the result of electrons in the semiconductor tunneling into the conduction band of the insulator with subsequent space charge buildup, a consequent avalanche, and a sustaining of the avalanche by a built-in space charge. For the insulator layer for an embodiment as is illustratively presented in FIG. 1, the insulator layer 20 must be an insulator at the temperature of operation of the device 10. Since certain materials are insulating at one temperature and conductive at another, the practice of this invention is contemplated for materials which are insulating at the operating temperature of the device. Consequently, semiconductors which have insulator properties at the temperature of operation of a device 10 are suitable for insulator layer 20. Illustrative materials which can serve for insulator layer 20 are $SiO_2$, GaAs, and CdS. As described above, the metal layer 24 for an illustrative embodiment for which the experimental data of FIG. 2 was obtained used Al therefor. The metal layer 24 can suitably be any material having metallic conduction properties at the temperature of operation of a device for the practice of this invention. Illustrative materials suitable for the metal layer 24 are Al Ag, and Au.

In the foregoing, the control electrode 18 has been specifically set forth in embodiments illustrated in FIGS. 2A and 2B as N-type and P-type semiconductors, respectively. However, it is within the contemplation of the practice of this invention that other materials serve for the control electrode. There is imposed the requirement that the reverse bias on the electrode effect change in the negative characteristic of the current-voltage curve across the device of the change from curve 72 to curve 70 of FIG. 4 so that it is possible to transfer to an operational state 80 from an operational state 78 on a negative resistance characteristic without substantially turning off the current in the device. An example is a metal-semiconductor rectifier in place of the P-N junction.

It is within the contemplation of the practice of this invention that a conjoint control of the operational state of an embodiment 10 as shown in FIG. 1 be attained by use of potential changes applied to both the control electrode 18 and the metal layer 24. Illustratively, the transfer from operational point 78 to operational point 80 on the negative resistance characteristic 72 of FIG. 4 can be achieved by a reverse bias on control electrode 18 and a transfer from operational state 80 to operational state 78 can be achieved by a transient increase in the voltage applied across device 10 between ohmic contacts 30 and 46.

Although there is not presently available a commonly accepted theoretical explanation for the origin of the negative resistance characteristic of a device for the practice of this invention, certain well established principles can be relied for identifying materials suitable therefor. Illustratively, FIG. 5 is a schematic diagram which presents the relationships among the valence and conduction bands of the metal layer 24, insulator 20, and semiconductor layer 12. At temperature of operation of a device for the practice of this invention, the thermal electron energies must be inadequate for transfer across the potential barrier from the semiconductor to the insulator conduction band and then to the metal.

While the invention has been particularly shown and described with reference to preferred embodiments thereof, it will be understood by those skilled in the art that the foregoing and other changes in form and details may be made therein without departing from the spirit and scope of the invention.

We claim:

1. A three terminal solid state device having a negative resistance in the current-voltage characteristics of a current conductive path thereof between two of said terminals which comprises:

a planar structure in said current conductive path having a metal layer, a semiconductor layer and an insulator layer therebetween which exhibits a negative resistance characteristic in said current conductive path, said metal layer and said semiconductor layer being connected to one each of said two terminals, respectively; and control electrode layer means connected to said other terminal and located adjacent to said semiconductor layer for providing a minority carrier injecting and extracting control electrode junction with said semiconductor layer, said control electrode junction being near to the surface of said semiconductor layer defined by said semiconductor layer and said insulator layer and substantially perpendicular to said semiconductor surface and proximate to and outside of said current conductive path for interchanging two stable operating conditions of said device by minority carrier injection and extraction in said semiconductor layer.

2. A device as set forth in claim 1 wherein said control electrode junction is in contact with said surface of said semiconductor layer.

3. A device as set forth in claim 1 wherein said junction is proximate to said current conductive path in said insulator layer by the order of the diffusion length for said minority carriers in said semiconductor layer.

4. A device as set forth in claim 1 wherein said control electrode is an N-type semiconductor and said semiconductor layer is P-type semiconductor.

5. A device as set forth in claim 4 wherein said metal is Al, said insulator layer is $SiO_2$ and said semiconductor is P-type Si.

6. A device as set forth in claim 5 wherein said $SiO_2$ insulator layer is doped with a dopant selected from the group of Ga and GaP.

7. A device as set forth in claim 1 wherein said control electrode is P-type semiconductor and said semiconductor layer is N-type semiconductor.

8. A device as set forth in claim 7 wherein said metal is Al, said insulator layer is $SiO_2$, said semiconductor layer is N-type Si, and said control electrode is P-type semiconductor.

9. A device is set forth in claim 8 wherein said $SiO_2$ insulator layer is doped with a dopant selected from the group consisting of Ga and GaP.